United States Patent [19]
Lindo

[11] 3,888,412
[45] June 10, 1975

[54] APPARATUS FOR HEATING THE FLUID IN A WINDSHIELD WASHER SYSTEM

[75] Inventor: Herbert Lindo, Mineola, N.Y.

[73] Assignee: Kenilworth Research & Development Corporation, Mineola, N.Y.

[22] Filed: Apr. 17, 1973

[21] Appl. No.: 352,009

[52] U.S. Cl............ 237/12.3 B; 137/599.1; 165/74; 165/76; 165/170
[51] Int. Cl............................................. B60h 1/06
[58] Field of Search.......... 237/12.3 B, 1 R; 165/74, 165/170, 76; 137/599.1

[56] References Cited
UNITED STATES PATENTS

| | | | |
|---|---|---|---|
| 1,575,667 | 3/1926 | Waters | 237/12.3 B |
| 2,107,031 | 2/1938 | Evans | 165/170 |
| 2,507,410 | 5/1950 | Kemp | 137/599.1 |
| 3,243,119 | 3/1966 | Merkle | 237/12.3 B |
| 3,424,238 | 1/1969 | Leeds et al. | 165/170 |
| 3,650,310 | 3/1972 | Childress | 165/44 |

Primary Examiner—William E. Wayner
Assistant Examiner—W. E. Tapolcai
Attorney, Agent, or Firm—Darby & Darby

[57] ABSTRACT

Windshield washer systems in which heat exchangers are located with respect to the reservoir containing the windshield washer fluid to heat the fluid.

10 Claims, 11 Drawing Figures

PATENTED JUN 10 1975　　　　　　　　　　3,888,412

SHEET 1

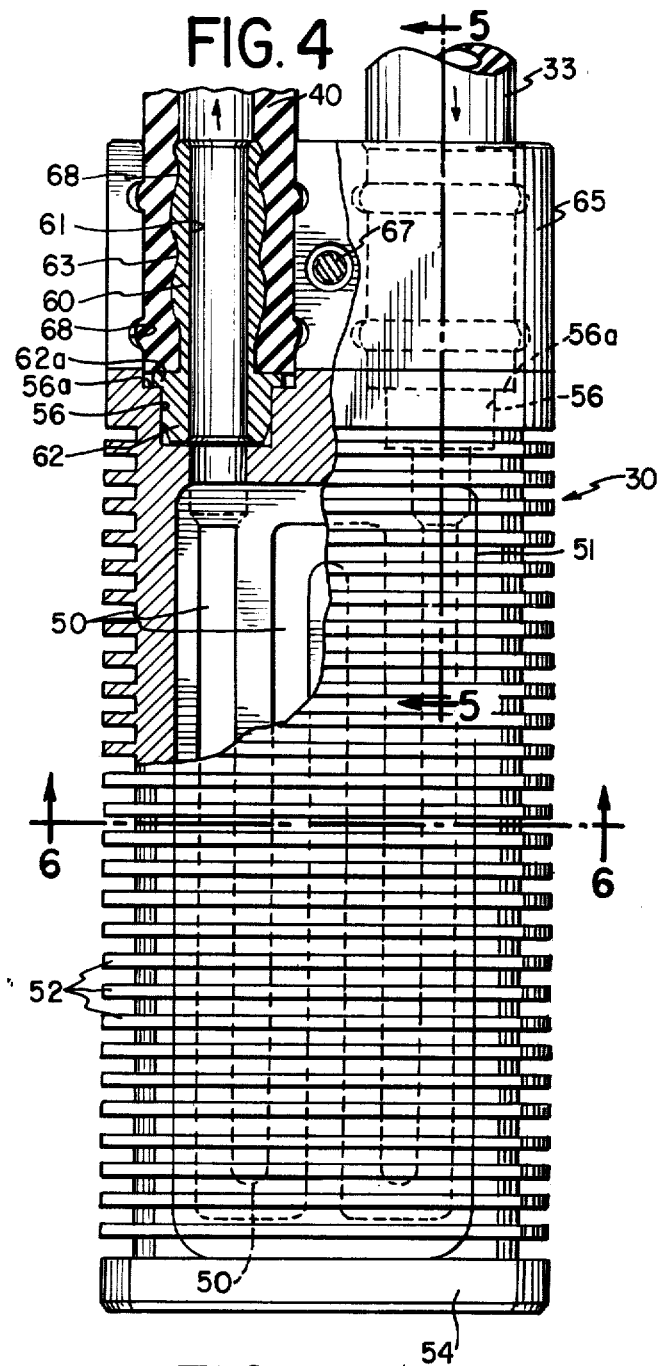
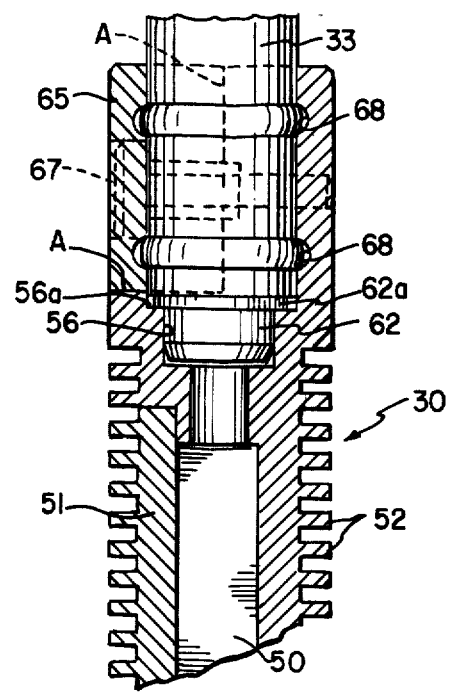
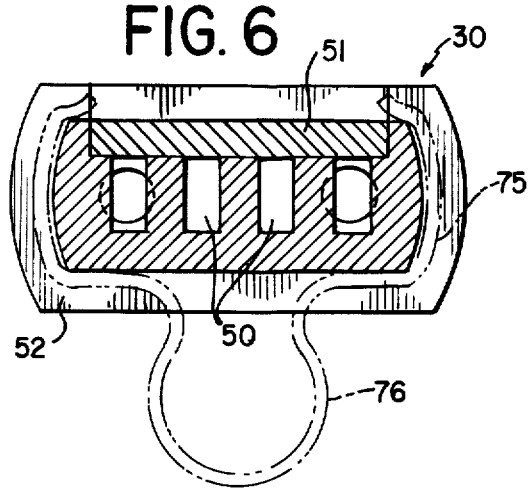
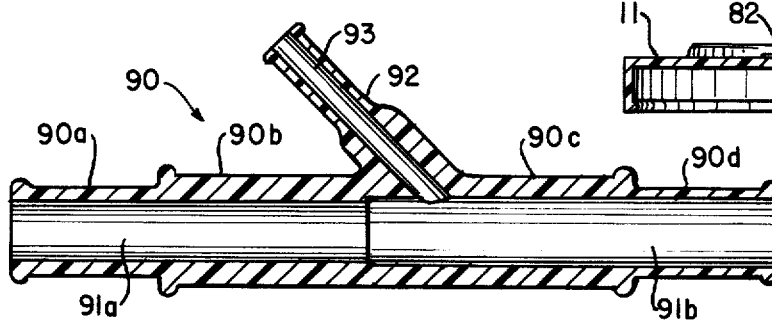

3,888,412

APPARATUS FOR HEATING THE FLUID IN A WINDSHIELD WASHER SYSTEM

In U.S. Pat. No. 3,243,119, issued to Leonard S. Merkel, which is now assigned to the assignee of the subject application, an apparatus is described for warming the fluid of a vehicle window washer system. The apparatus of that patent utilizes a U-shaped pipe which extends into the reservoir containing the washer fluid for heating the fluid. The pipe has an input from the hot coolant flow tube coupled between the radiator of the car and its heater. The outlet from the U-shaped pipe is to the coolant return hose between the car heater and the radiator.

The present invention relates to an improvement in a device of the type disclosed in the aforesaid patent and, more specifically, includes heat exchangers which are considerably more efficient while being relatively simple to make. In a preferred embodiment of the invention, the heat exchanger is made to fit within the opening normally provided for the reservoir and comes into direct contact with the fluid. The exchanger includes a number of fins to enclose the surface area over which the heat exchange takes place. In another embodiment, the heat exchanger is made as a separate unit whose surface contacts the surface of the reservoir.

It is therefore an object of the present invention to provide an apparatus for warming the fluid of a vehicle window washer system utilizing novel heat exchangers.

A further object is to provide an apparatus for heating the fluid of a vehicle window washer system in which a heat exchanger is supplied having both inlet and outlet connections to a coolant flow hose connected between the radiator and the heater of an automobile.

Another object is to provide an apparatus for warming the fluid of a vehicle window washer system which is highly efficient and is of compact design.

Other objects and advantages of the present invention will become more apparent upon reference to the following specification and annexed drawings, in which:

FIG. 3A is a cross-sectional view of a coupling for use with the embodiment of FIG. 3;

FIG. 4 is an elevational view, partly broken away and partly in cross-section, showing the details of the preferred embodiment of the heat exchanger;

FIG. 5 is a fragmentary view, taken in cross-section, looking at the end of the heat exchanger along the lines 5—5 of FIG. 4;

FIG. 6 is a cross-sectional view of the heat exchanger taken along lines 6—6 of FIG. 4;

FIG. 7 is a view of a modified cover for the reservoir;

Figure 1:
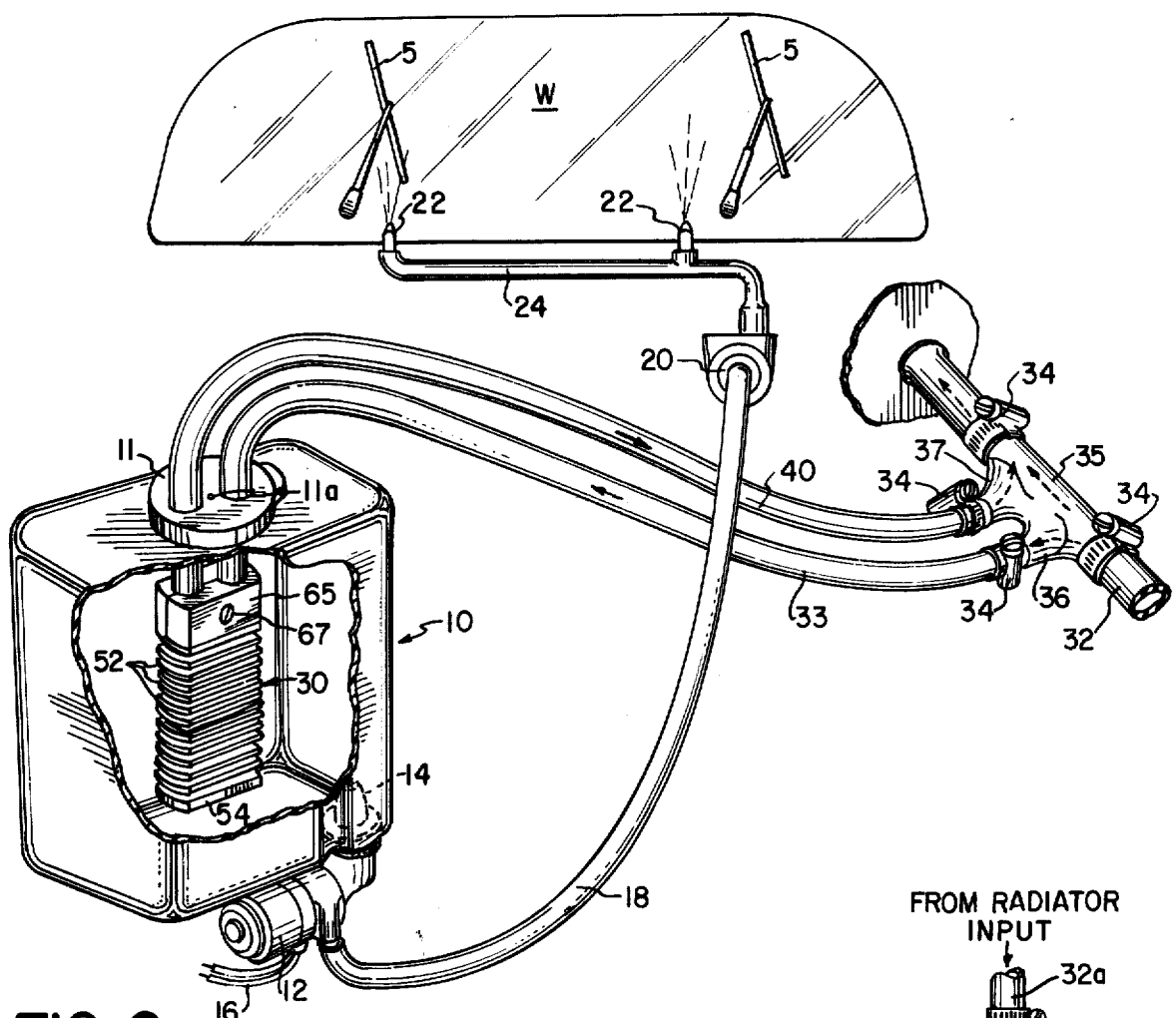
FIG. 1 is a view, partly is perspective form and partly broken away, showing the overall connection of the system together with one embodiment of the apparatus according to the present invention.

Referring to FIG. 1, there is shown a typical reservoir 10 for a vehicle, such as an automobile, for holding a quantity of fluid (not shown) for washing the windshield of the vehicle in conjunction with one or more wipers 5. Reservoir 10 is commonly made of a suitable plastic material. In the embodiment of FIG. 1, a pump 12 is attached to the bottom of reservoir 10. The pump has an intake, or inlet, 14 extending within the reservoir. A pair of lead wires 16, which supply electrical current to pump 12, extend from the pump into the vehicle to a switch (not shown) which is accessible to the operator. When operated, a pump 12 takes fluid from the reservoir 10 and supplies it through a tube 18 which is attached to a suitable fitting 20. From there the fluid is passed to a pair of jet-type nozzles 22 through a common manifold arm 24 which is, in turn, attached to the coupling 20.

As heretofore described, the windshield washer system is of conventional construction. In accordance with the subject invention, a heat exchanger 30 is disposed within the reservoir 10 so that at least a portion thereof comes in contact with the washer fluid. The exchanger 30 is of a size so that it will fit within the reservoir opening without enlarging the latter. The exchanger 30 is supplied with hot water, or heated coolant, from the radiator of the vehicle through a hose 32 which is connected between the vehicle's radiator and its heater. The direction of the fluid-flow in hose 32 is shown by the arrows. A portion of the fluid flowing in hose 32 is tapped off from branch arm 36 of a coupling 35 which is connected to hose 32 and is supplied to an inlet hose 33 for exchanger 30. The fluid circulates through the exchanger 30 and is returned to the hose 32 and thence to the vehicle's heater via an outlet hose 40 connected between the heat exchanger and a second branch arm 37 of the coupling 35. As shown, the hose connections to the coupling 35 are made with any suitable conventional clamps 34.

In the embodiment shown in FIG. 1, it is contemplated that only the single coolant hose 32 between the vehicle's radiator and its heater be used. In this case, it is also contemplated that either the heater of the vehicle is operating or a suitable bypass device (not shown) is used so that there will be a flow of heated coolant from the radiator to the heater and back to the radiator through the return hose. As an alternative to this, as shown in FIG. 2, the input to the heat exchanger is from the hose 32a leading from the radiator to the heater and its output goes to the heater return hose 32b.

Figure 2:
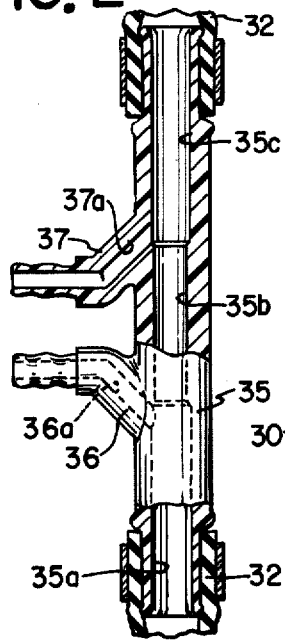
FIG. 2 is an elevational view, partly in cross-section of a preferred form of coupler for use with the embodiment of FIG. 1.

FIG. 2 shows the details of the coupling 35 for the embodiment of FIG. 1. This coupling can be made of plastic, metal, or other suitable material. The main body of the coupling has two different outer diameters to accommodate two different heater hose sizes. The hose 32 is shown clamped around the smaller diamter sections of the body at the inlet and the outlet. The fluid outlet branch arm 36, which leads to the heat exchanger, has a passage 36a which is disposed at an angle to the direction of the fluid-flow from hose 32. The angle between the main passage of the coupler and passage 36a is preferably about 45° or less. The purpose of this angle is to enable a better fluid-flow into heat exchanger 30. Similarly, the fluid return branch arm 37 has a passage 37a which is angled in the reverse direction to passage 36a to aid in the return of the fluid from the heat exchanger into coupling 35 and then to the hose 32.

To maintain a more stable fluid flow in the hose 32, taking into account the fluid which is to be bled off the circulated through exchanger 30, the main arm of coupling 35 has a passage therethrough of stepped diameter. This includes a first portion 35a of an enlarged diameter from the inlet from heater hose 32 to the branch outlet 36 and its passage 36a, and then a portion 35b of reduced diameter extending substantially between the two passages 36a and 37a of the branch arms 36 and 37. The reduction in diameter between the passages 35a and 35b creates a Venturi effect so that the fluid moves faster through section 35b to take into account the loss of fluid bled off into the branch 36. Similarly, a passage of enlarged diameter 35c, equal to that of 35a, joins the passage 35b and extends to the outlet of coupling 35. Here again, a Venturi effect is produced to slow down the velocity of the fluid leaving the coupling so as to take into account the fluid which returns to branch 37 of coupling 35 from the heat exchanger 30.

FIGS. 4–6 show the details of the heat exchanger 30. The exchanger is a generally rectangular elongated body which is cast from metal having good heat conductivity, such as a zinc alloy, or other suitable material. The casting can be in two halves, made by any suitable process and then the halves are joined together by a suitable technique such as brazing, welding, etc. As an alternative to this, and as shown in FIGS. 5 and 6 the exchanger includes a plate 51 which covers the main portion of the exchanger body. All of the body except the plate can be cast as one piece since there is access to the interior of the body. The plate can be fastened to the body to complete the assembly by way of the suitable techniques listed above.

The exchanger has a solid base 54. The lower portion of the interior of the exchanger body is formed with a generally serpentine fluid flow passage 50. A number of fins 52 are formed on the lower portion of the body, as well as on the plate 51, to provide a greater surface area for the heat exchange between the heated fluid flowing in the body and the fluid in the reservoir.

The upper portion of the exchanger body has a pair of bores 56 formed thereon to communicate with the inlet and outlet ends of the flow passage 50. Each of the bores 56 has a stepped shoulder 56a of slightly larger diameter. A union coupling 60 is placed in each of the bores 56. Each coupling 60 has a through passage 61 and is formed with a head 62 at its lower end to fit within a respective bore 56 and a shoulder 62a to engage the shoulder 56a of the bore. Each coupling 60 has an irregular shaped outer surface 63 along its length above shoulder 62a.

A respective hose 33 or 40 is forced over the irregular outer surface 63 of a coupling 60 to engage its shoulder 62a. The outer diameter of the irregular surface 63 is made somewhat larger than the inner diameter of the hose to provide a tight fit. The top of the heat exchanger body above the bores 56 is partially cut away, as shown by the line A—A of FIG. 5 to accommodate the hoses 33, 40 and the respective couplings 60.

A cap 65 is placed over the exposed portion of the hose and fastened to the body by a screw 67. Both the cap 65 and the section A—A of the body have grooves 68 thereon to permit the ends of the hoses to expand therein when cap 65 is tightened down. By using this arrangement, both couplings 60 and the respective hoses 33 and 40 are held tightly within the body and the hoses cannot be pulled from the exchanger.

A reservoir cover 11 is slipped over hoses 33, 40 before the final assembly of cap 65 to the exchanger. The cover 11 closes the opening of the reservoir through its opening and the cover then slid down over the hoses to close the reservoir opening. A hole 11a is provided in the cover 11 to permit the escape of any pressure built up in the reservoir. The cover 11 is preferably sold as part of the unit for ease of installation.

The system operates to convey heated water or coolant from the radiator hose 32 into the hose 33 and thence into the heat exchanger 30. The fluid travels through the serpentine passage 50 and heats up the body of the exchanger 30. Heat is conveyed from the fins 52 to the washer solution in the reservoir 10. The fluid exits the passage 50 of the exchanger through the hose 40 and returns to the heater hose 32. The coolant circulates through the exchanger 30. When the heater is operating, the bypass (not shown) between the heater inlet and outlet hoses is open. The heat produced by the exchanger keeps the fluid warm.

The arrangement of FIG. 1 makes heated washer fluid available at nozzles 22 for application to the windshield W. The heated fluid is supplied by hose 18 from reservoir 10 upon actuation of the pump 12. Only one change is made to the cooling system of the auto, that is, a cut in hose 32 so that coupling 35 can be inserted and the exchanger 30 attached.

Figure 3:
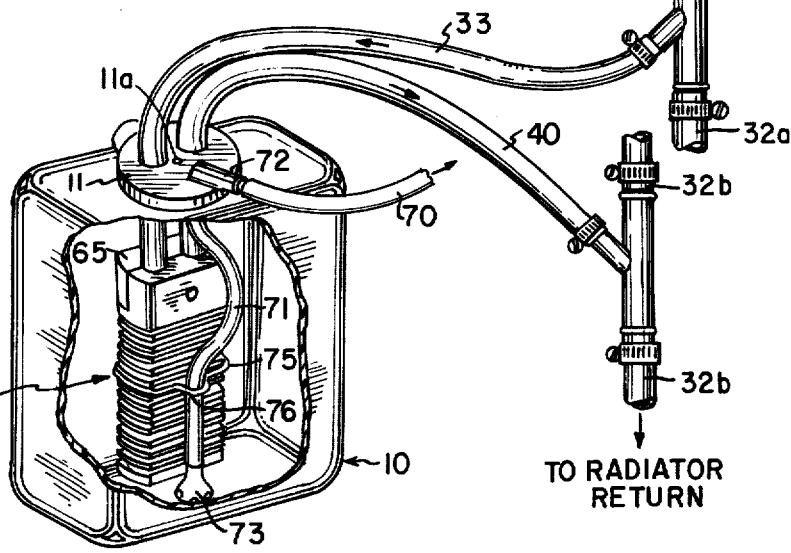
FIG. 3 is a perspective view, partly broken away, of a further embodiment of the invention.

FIG. 3 shows a further embodiment of the invention which is made to accommodate another commonly used windshield washer system. In this system, instead of having the windshield washer pump 12 located at the bottom of the reservoir 10, the pump (not shown) is located on another part of the vehicle and a syphon tube 71 which extends into the reservoir 10 through a fitting 72 on the cap. Syphon 71 has an inlet 73 at its lower end which usually includes a strainer (not shown). As seen in both FIGS. 2 and 6, the syphon tube 71 is held to the exchanger by a spring clip 75 having a partially circular projection 76 in which tube 71 fits. Clip 75 fits around the sides of the body and is preferably located between two of the fins 52.

FIG. 3, instead of using the arrangement to tap off heated coolant from the heater supply hose 32, and to return the fluid to the same hose, an arrangement is utilized which permits heating of the washer fluid at all times, even when the heater is off. Here, the inlet line 33 to the exchanger taps off coolant from the heater input hose 32a. The exchanger output line returns the heated coolant after it has passed through the exchanger to the radiator return hose 32b. Thus, there will always be a continuous circulation of heated coolant through exchanger 30, irrespective of whether the heater is operating or a separate bypass used.

Standard T fittings can be used for the couplings of the system of FIG. 2. However, it is preferred that a fitting be used utilizing the principles of the one shown in FIG. 2. FIG. 3A shows a fitting 90 for use with both the heater inlet and return hoses 32a and 32b. Fitting 90 is made of a suitable metal, or high temperature plastic material, and has a body with reduced diameter end sections 90a and 90d and larger diameter mid section 90b and 90c. The various sections 90a–90d accommodate different diameter radiator hoses. A stepped diameter bore is formed through length of the coupling body having a reduced diameter portion 91a running the length of body sections 90a and 90b and an enlarged diameter portion 91b running the length of body sections 90c and 90d.

An outlet arm 92 is formed on the coupling at an angle of about 45° to the longitudinal axis of the body. Arm 92 has a flow passage 93 of lesser diameter than either of the passages 91a and 91b. Passage 93 intersects the larger diameter passage 91b of the body.

Coupling 90 is similar in operation to coupling 35. For example, where it is to be used in the radiator inlet hose 32a, the fluid flow is from right to left as shown in FIG. 3A. Thus, fluid is tapped off from the larger diameter passage 91b through passage 93 of arm 92 to the heat exchanger inlet hose 33. The reduced diameter passage section 91a increases the fluid velocity to the heater. When used in the heater return line 32b, the fluid flow through coupling 90 is from left to right. The fluid by-passed through the heat exchanger enters passage 93 from exchanger outlet hose 40 into the larger diameter passage 91b. In either case, the dimensions of the coupling passages accommodate the fluid bled off to and returned from the heat exchanger.

Either of the types of reservoirs 10 shown in FIGS. 1 and 3 can be used interchangeably with the radiator hose arrangements of the two figures. The system of FIG. 3 operates as previously described with the exception that the heated fluid is drawn from the reservoir by tube 71 and conveyed to the nozzles 22 by the hose 70.

As seen in each of the embodiments of FIGS. 1 and 3, the cap 11 has a hole 11a therein to vent any excess pressure built up within the reservoir 10 due to the heating of the fluid. If desired, to prevent unnecessary evaportion of the fluid within the reservoir, a suitable check valve system can be used to cover the hole 11a. One such arrangement is shown in FIG. 7. Here, a cage 80 is formed on top of the cap 11 and a ball 82 check valve is located within the cage to cover the hole 11a. When the pressure within the reservoir exceeds that set by the weight of the ball, the ball will be forced upwardly and excess pressure will be vented from the reservoir. When the pressure is below that needed to move the ball, it will drop back to cover the hole and thereby prevent evaporation of the fluid.

It should be understood that any suitable arrangement can be used for the check valve, for example, a flapper-type check valve, a spring-loaded check valve, etc.

Figure 8:
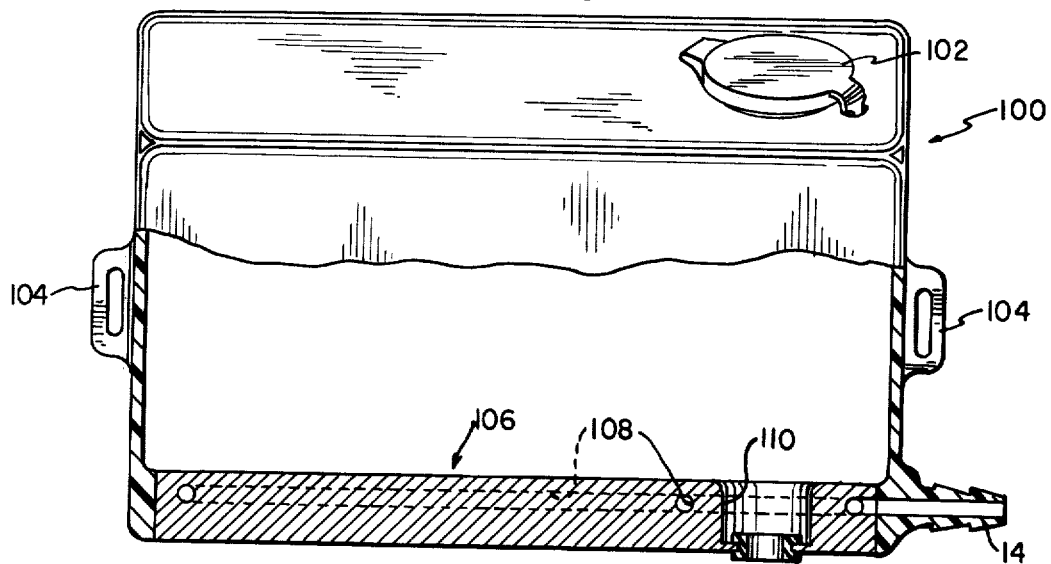
FIGS. 8, 9 and 10 are elevational, bottom and side views respectively of another embodiment of the invention with FIG. 8 being partially in cross-section.
Figure 9:
Figure 10:
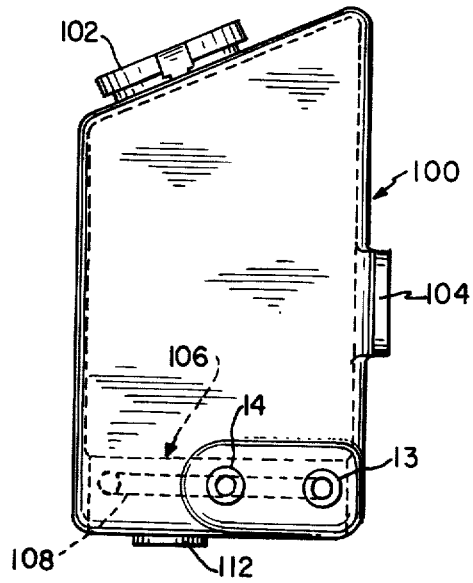

FIGS. 8–10 show another embodiment of the invention using a different form of exchanger. Here, a reservoir 100 is provided having a cover 102 and eyelets 104 for attaching the reservoir to the vehicle body. The bottom of reservoir 100 is closed off by a heat exchanger 106. The reservoir can be made of a suitable plastic material as can be the exchanger 106. Alternately, the exchanger 106 can be made of metal to improve the heat transfer characteristics. The exchange is attached to the reservoir body by any suitable technique such as by heat sealing, ultrasonic welding or adhesives, in the case where plastic material is used for both components. Where the exchanger is made of metal, it can be fastened to the reservoir by any suitable adhesive with the necessary seals being made.

The exchanger 106 is a solid body having a passage 108 formed in its interior. Then, for example, the exchanger can be molded in two pieces, to form passage 108, and the two pieces then joined together by any conventional technique. Passage 108 is serpentine in shape and it is formed closer to the upper wall of the exchanger, that is, the wall closest to the fluid in the reservoir 100. An inlet fitting 13 and an outlet fitting 14 are formed on one end of the exchanger and they communicate with the passage 108. The fittings 13 and 14 have the hoses 33 and 40 (not shown) connected thereto to circulate the heated coolant from the vehicle's radiator through the passage 108. Here again, only one coupling is needed to attach to the vehicle's cooling system.

The exchanger 106 is formed with a hole 110 having a grommet 112. If the washer system uses a pump mounted to the reservoir, such as shown in FIG. 1, or a system in which the outlet is to be at the bottom of the reservoir, then the fluid intake to the pump or remainder of the system passes through the grommet. If the system uses a syphon tube, such as shown in FIG. 3, then hole 110 is sealed by a plug and the syphon tube enters the reservoir through the cover 102, in a manner similar to that shown in FIG. 3.

As should be appreciated, the heated coolant circulating through passage 108 of exchanger 106 heats the fluid in the reservoir. The heated fluid is applied to windshield W through the nozzles 22 when the system is operated.

It should be understood that the exchanger 106 can be located at one or more of the side walls. The advantage of this is that there will be less heating area available to the reservoir as the fluid supply diminishes. This prevents overheating of the washer fluid and/or too rapid evaporation.

What is claimed is:

1. Apparatus for heating fluid in a windshield system of a motor vehicle having a liquid cooling system including a heater line in which the cooling system fluid flows, comprising a reservoir for holding windshield washer fluid, an opening formed in a portion of a wall of said reservoir, heat exchanger means comprising a heat exchanger housing of closed configuration and being of a size to fit through said opening and located completely within said reservoir, said heat exchanger housing having extending fin members for immersion in the windshield washer fluid and having a generally serpentine internal fluid flow passage therein with an inlet and an outlet, said heat exchanger also being formed with an open section in communication with the inlet and outlet of said fluid flow passage, a pair of nipples located in said housing open section in fluid flow communication respectively with the inlet and outlet of said fluid flow passage, a respective hose extending through said reservoir opening and attached to each of said nipples, cover means fastened to said heat exchanger housing at said open section and engaging said hoses to hold them in fixed relationship with the heat exchanger housing, and means for coupling said hoses to the cooling system heater line of the vehicle to bypass a portion of the cooling system fluid through the fluid flow passage of the heat exchanger and back to the cooling system.

2. Apparatus as in claim 1 wherein said coupling means comprises a coupling fitting having outlet and return arms branching from a main arm having a through passage, said main arm of said fitting connected with its through passage in series in only one line of the cooling system, a respective one of said hoses connected to an arm of said fitting.

3. Apparatus as in claim 2 wherein said coupling fitting outlet branch arm is disposed at an acute angle to the direction of flow of the cooling system liquid in its main arm, and the return branch arm is disposed at an obtuse angle to the direction of flow of the cooling system liquid.

4. Apparatus as in claim 3 wherein said main arm has a portion of a reduced diameter between the two branch arms.

5. Apparatus as in claim 1 further comprising a vent for said reservoir to relieve excess pressure built up upon heating the fluid therein.

6. Apparatus as in claim 1 wherein said reservoir includes a second opening into the reservoir interior separate from said first opening through which a fluid extraction means can be inserted.

7. Apparatus as in claim 1 wherein said coupling means comprises a coupling fitting connected in said heater line, said fitting having a central body with a through fluid flow passage having sections of different diameters and an arm attached to said central body at an acute angle thereto to which respective one of said hoses is to be attached, said arm having a fluid flow passage of smaller diameter than the smallest diameter of the flow passage of the central body.

8. Apparatus as in claim 7 wherein the flow passage of the arm communicates with the largest diameter section of the flow passage of the central body.

9. Apparatus as in claim 1 wherein the coupling means comprises a respective coupling fitting for each of the cooling system inlet and return lines, each said fitting having a branch arm adapted to have an end of a respective one of said hoses connected thereto and a main arm for connection in a respective cooling system line, each said branch arm of each said coupling fitting forming an acute angle with its respective main arm in the direction of fluid flow in the respective line in which it is connected.

10. Apparatus as in claim 1 further comprising a cap for covering said reservoir opening, said hoses extending through said cap to said heat exchanger housing.

* * * * *